United States Patent [19]

Przybylek

[11] 4,205,418

[45] Jun. 3, 1980

[54] METHOD OF MAKING A CURVED ELECTRODE PLATE

[75] Inventor: George J. Przybylek, Warren, N.J.

[73] Assignee: Burroughs Corporation, Detroit, Mich.

[21] Appl. No.: 928,960

[22] Filed: Jul. 28, 1978

[51] Int. Cl.$^2$ .............................. H01J 1/53; H01J 9/00
[52] U.S. Cl. ...................................... 29/25.18; 29/874
[58] Field of Search ........................... 29/25.18, 630 C

[56] References Cited

U.S. PATENT DOCUMENTS

| | | | |
|---|---|---|---|
| 3,017,687 | 1/1962 | Day | 29/25.18 |
| 3,152,384 | 10/1964 | Toohig et al. | 29/25.18 |
| 3,482,241 | 12/1969 | Johnson | 340/365 C |
| 3,696,409 | 10/1972 | Braaten | 340/365 C |
| 3,757,322 | 9/1973 | Barkan et al. | 340/365 C |
| 3,864,797 | 2/1975 | Banks | 29/25.18 |
| 3,983,613 | 10/1976 | Palac et al. | 29/25.18 |

Primary Examiner—John McQuade
Attorney, Agent, or Firm—Kevin R. Peterson; Robert A. Green; Edward J. Feeney, Jr.

[57] ABSTRACT

The disclosure is of a cathode ray tube having a face plate for displaying information and carrying an electrode assembly which is curved to couple intimately to the face plate. The electrode assembly includes a shield against radio frequency interference and an insulating support sheet having an inner surface and an outer surface, on each of which an array of rows and columns of conductive areas is formed. On the inner surface, the rows of conductive areas are electrically connected together to output contact pads at a side edge of the sheet, and, on the outer surface, the columns of conductive areas are electrically connected together to output contact pads along the lower edge of the sheet. Each outer conductive area overlies and is capacitively coupled to an inner conductive area. A column conductor which extends from a contact pad at an edge of the outer surface of the sheet is capacitively coupled to each column of outer conductive areas. The method of the invention comprises forming the desired conductive areas of indium-tin-oxide on a flat glass sheet and then sagging the glass sheet to the desired curvature.

4 Claims, 3 Drawing Figures

METHOD OF MAKING A CURVED ELECTRODE PLATE

BACKGROUND OF THE INVENTION

Touch-controlled display devices and systems are known in the art, and U.S. Pat. Nos. 3,757,322; 3,482,241; and 3,696,409 are examples of such devices and systems. However, in such devices in the past where the structure was shaped to conform to the curved face plate of a cathode ray tube (CRT), it was necessary to first curve a support sheet and then form the electrode arrays therein. Such a method produces imperfect electrode arrays. According to the present invention, the electrode arrays can be formed on a flat sheet, and this assembly is then curved or shaped as desired.

DESCRIPTION OF THE PREFERRED EMBODIMENTS

Figure 1:
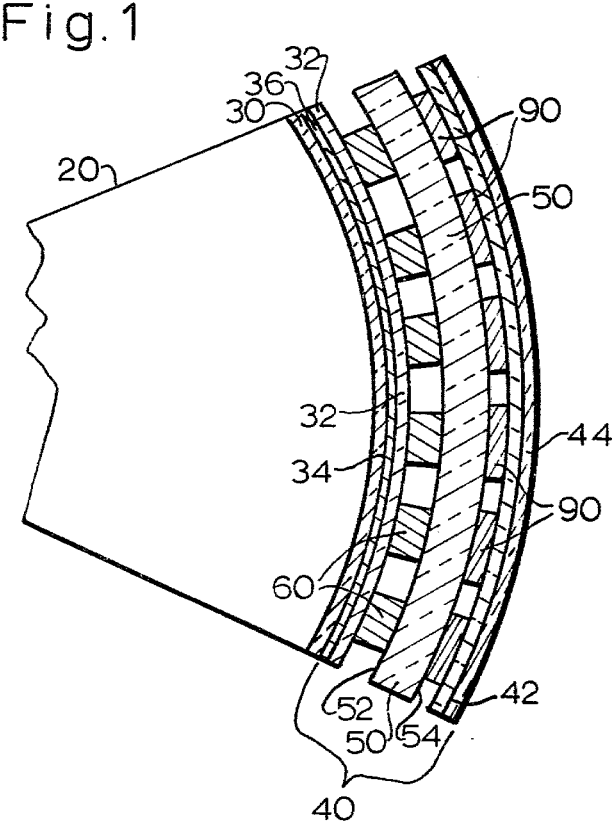
FIG. 1 is a sectional view of a cathode ray tube face plate and electrode assembly made by the method of the invention.
Figure 3:
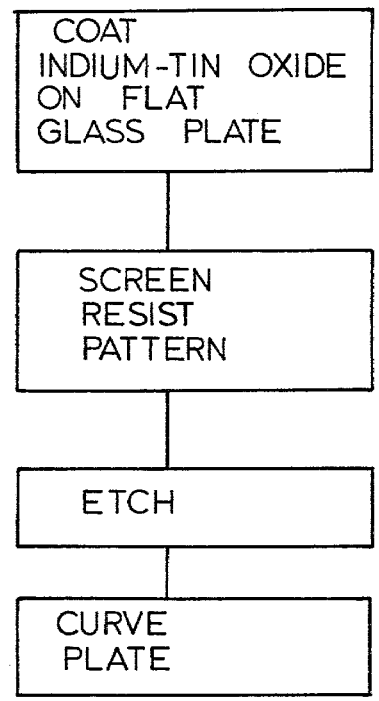
FIG. 3 is a flow chart illustrating the method of the invention.
Figure 2:
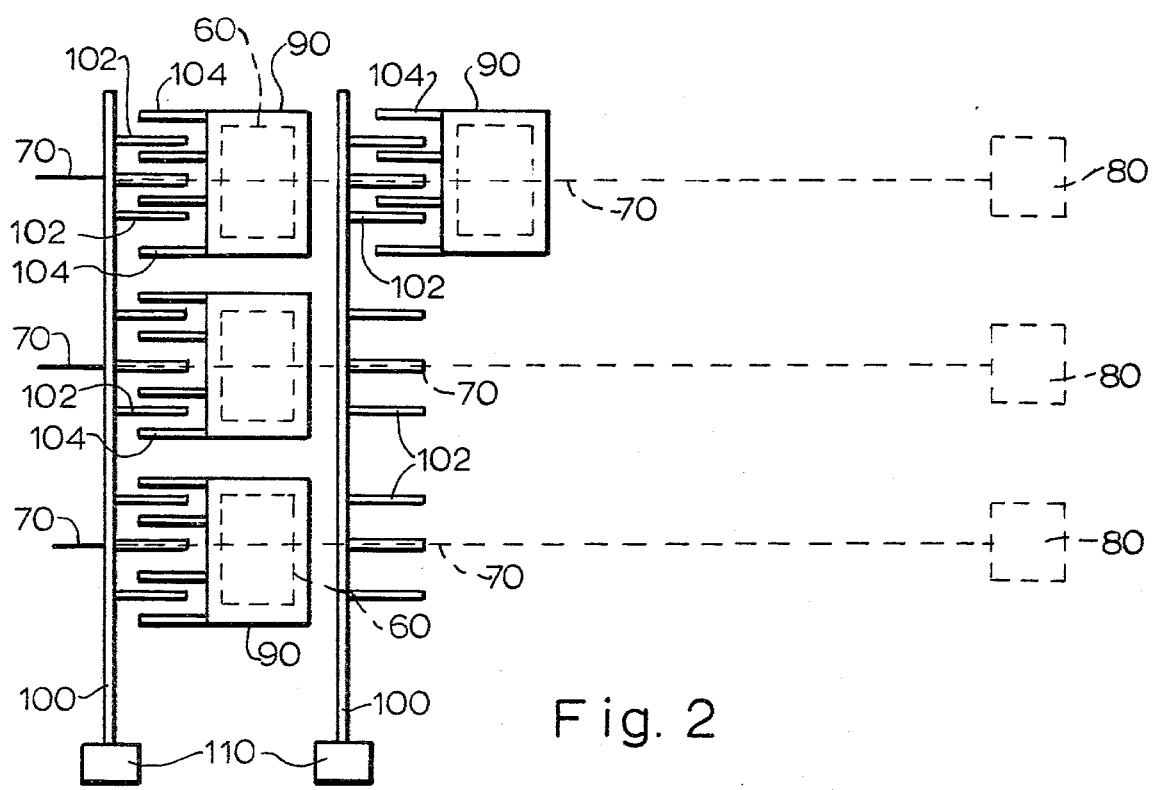
FIG. 2 is a plan view, in schematic form, of the electrodes of the assembly made by the method of present invention.

Apparatus 10 made according to the invention comprises a cathode ray tube 20 having a phosphor-coated face plate 30, with an electronic assembly 40 made according to the invention secured to, or removably coupled to, the face plate but shaped to match the curvature of the face plate. The assembly 40 includes a sheet of glass 32 having, on its inner surface, a transparent conductive layer 36 of tin oxide or the like which acts as a shield against radio frequency interference. The assembly 40 also includes a sheet 50 of insulating material, for example, glass, which carries on its inner surface 52 an array of transparent conductive film areas or electrodes 60 disposed in rows and columns. Each row of electrodes 60 is electrically connected by a conductor 70 (FIG. 2) to a contact pad 80 at an edge of the glass plate. The outer surface 54 of the glass plate is similarly provided with an array of rows and columns of transparent conductive film areas or electrodes 90, each area 90 overlying and aligned with one of the areas 60 on the inner surface. A column conductor 100 is provided for each column of conductive film areas and is capacitively coupled by means of conductive fingers 102 which are interleaved with conductive fingers 104 which extend from each of the outer areas. Each column conductor 100 extends to a conductive contact pad 110 at the lower edge of the glass plate.

The interleaving of the conductive fingers 102 and 104 provides efficient coupling between the column conductors 100 and the electrodes 90. A layer 42 of a clear dielectric is provided over the outer surface of plate 50 for insulating purposes.

According to the invention, the assembly 40 is prepared by coating both surfaces of a flat glass plate with a layer of indium-tin-oxide, screening patterns of etchant-resistant material on the inner and outer surfaces, and then etching to provide the electrodes 60 and 90 described above. The layer 42 is provided, and the flat plate thus treated is placed in a suitably shaped mold, and it is heated sufficiently to cause it to sag to conform to the shape of the cathode ray tube face plate 30 which comprises a support for the assembly 40. In the past, such curved assemblies had to be formed by first curving the glass plate and then forming electrodes thereon; the art did not permit forming the electrodes on a flat plate and then curving the plate.

If desired, an anti-reflection coating 44 may be provided on the outer surface of the assembly 40.

The operation of the assembly made by the invention is described in detail and claimed in application Ser. No. 928,958 filed on July 28, 1978 of George E. Holz entitled Touch Panel and Operating System, and incorporated herein by reference. For a brief description of the operation of the invention, positive pulses are applied to each of the column conductors 100 in turn and thus to each of the outer conductive areas 90. The pulses couple through to the rear conductors and are sensed as being present on sense lines 70 by appropriate electronics including a computer. When the operator desires to display a unit of information, he touches his finger to the proper outer conductive area 90, and this decouples the applied pulse from the underlying inner area 60 and provides a zero output at the associated row and column contact pad 80 and 110, respectively. This output or switch closure is coupled through the associated circuitry, where the closure is computer-analyzed and activates a pertinent response which may be to display information on the CRT or activate an electronic circuit.

What is claimed is:

1. The method of making a touch sensitive display panel comprising
   providing a flat glass plate having top and bottom surfaces,
   forming electrodes of indium-tin-oxide on one of said surfaces,
   molding said plate to a desired curvature, and
   coupling the curved plate to a support member.

2. The method of making a touch sensitive display panel comprising
   providing a flat glass plate having top and bottom surfaces,
   forming electrodes of indium-tin-oxide on one of said surfaces,
   heating said plate on a mold to form said plate to a desired curvature, and
   coupling the curved plate to a support member.

3. The method of making a touch-sensitive display panel comprising
   providing a flat glass plate having top and bottom surfaces,
   providing a layer of indium-tin-oxide on each of said surfaces,
   screening a layer of etchant-resistant material in a pattern on said layers of indium-tin-oxide so that portions of said layers are coated with said material and some portions are not,
   etching and removing the uncoated portions of said layers to leave patterns of indium-tin-oxide electrodes on said surfaces,
   molding said plate to a desired curvature, and
   coupling the curved plate to a support member.

4. The method of making a curved electrode assembly comprising providing a flat glass plate having top and bottom surfaces, forming electrodes of indium-tin-oxide on one of said surfaces, and molding said plate to a desired curvature.

* * * * *